United States Patent
Laurant et al.

(10) Patent No.: US 7,648,277 B2
(45) Date of Patent: Jan. 19, 2010

(54) DEVICE FOR SUPPORTING AND GUIDING A ROTATING SHAFT

(75) Inventors: Franck Laurant, Saint Romain de Colbosc (FR); Cyril Defaye, Niort (FR)

(73) Assignee: SNECMA, Paris (FR)

(*) Notice: Subject to any disclaimer, the term of this patent is extended or adjusted under 35 U.S.C. 154(b) by 727 days.

(21) Appl. No.: 11/247,281

(22) Filed: Oct. 12, 2005

(65) Prior Publication Data
US 2006/0083449 A1 Apr. 20, 2006

(30) Foreign Application Priority Data
Oct. 19, 2004 (FR) .................................. 04 11046

(51) Int. Cl.
 *F16C 27/00* (2006.01)
 *F16C 32/06* (2006.01)
(52) U.S. Cl. ....................................................... 384/99
(58) Field of Classification Search .................. 384/99, 384/535, 558, 581
See application file for complete search history.

(56) References Cited

U.S. PATENT DOCUMENTS

| 4,449,721 A * | 5/1984 | Tsuge .......................... 277/499 |
| 5,067,825 A | 11/1991 | Vance et al. |
| 5,106,208 A | 4/1992 | Bobo et al. |
| 5,197,807 A | 3/1993 | Kuznar |

FOREIGN PATENT DOCUMENTS

JP   8-261231   10/1996

\* cited by examiner

*Primary Examiner*—William C Joyce
(74) *Attorney, Agent, or Firm*—Oblon, Spivak, McClelland, Maier & Neustadt, L.L.P.

(57) ABSTRACT

A device for supporting and guiding a rotating shaft, in particular a rotor shaft of an airplane turboprop or turbojet, the device comprising an oil squeeze damper around each bearing of the shaft, said damper comprising an annular space surrounding the outer ring of the bearing and defined by annular sealing elements, each having a small number of calibrated oil outlet orifices formed in its outer periphery.

13 Claims, 2 Drawing Sheets

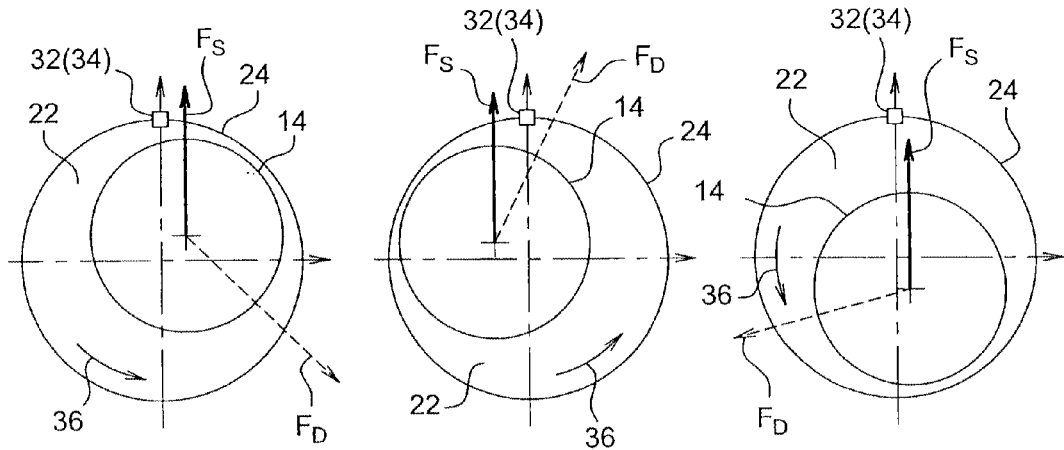
Fig. 4
BACKGROUND ART
Fig. 5
BACKGROUND ART
Fig. 6
BACKGROUND ART
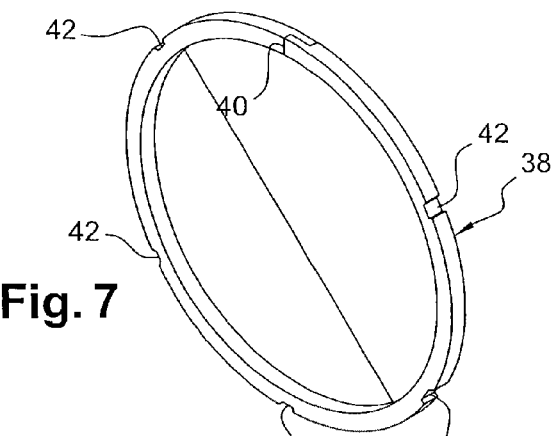
Fig. 7
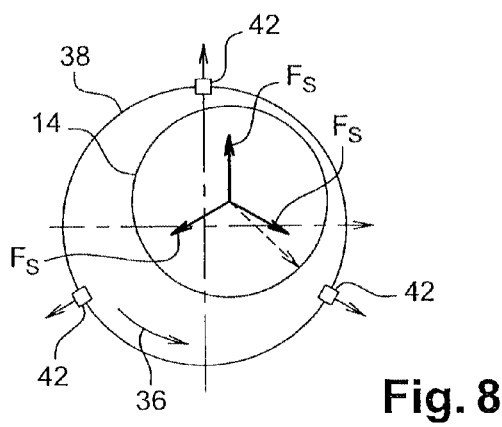
Fig. 8

DEVICE FOR SUPPORTING AND GUIDING A ROTATING SHAFT

The invention relates to a device for supporting and guiding a rotating shaft, in particular a rotor shaft in a turbomachine such as an airplane turboprop or turbojet.

BACKGROUND OF THE INVENTION

Small amounts of rotor shaft unbalance tend to lead to radial vibration and eccentricity of the shaft and its bearings, that must be damped by means of devices for compressing a film of oil (squeeze film dampers) associated with the bearings for supporting and guiding the shaft.

Each squeeze film damper comprises a housing formed in a support case of the corresponding bearing in which the outer ring of the bearing is mounted with a small amount of radial clearance. An annular space defined around the ring in said housing is filled with oil and is closed axially by annular sealing elements that are free to rotate in annular grooves of the outer ring of the bearing and that co-operate in sealed manner with an inner cylindrical surface of the case.

Oil inlet orifices are formed in the case and open out into the above-mentioned annular space, and oil outlet orifices are formed in the annular sealing elements and open out to the outside of said annular space so as to enable oil to be caused to flow continuously through the annular space and be cooled outside said space so as to remove the heat energy dissipated by the friction that results from the oil film being compressed by the outer ring of the bearing during its orbital movement in the above-mentioned housing. Without cooling, the temperature rise of the oil in the annular space would lead to a significant drop in its viscosity and thus in its ability to damp the orbital movements of the outer ring of the shaft bearing.

For the shaft of an airplane turboprop or turbojet, the annular sealing elements are generally made of segments that withstand high temperatures, said segments being split rings of elastically-deformable metal, and conventionally they are of rectangular section. The splitting slots in such segments may be cross-cut or they may be cut with an overlap, and they form oil outlet orifices. In order to ensure an oil leakage rate that is sufficient, it is preferable to use cross-cut segments rather than overlap-cut segments, and to make a step in the outer periphery of each segment in register with its slot so as to calibrate the oil leakage flow rate.

Oil leakage is thus localized at a specific point around the circumference of the segment. Nevertheless, the rate at which oil leaks through the slot is observed to vary strongly as a function of the angular position of the outer ring of the bearing relative to the slot. Analysis of the behavior of the damper has shown that the outer ring of the bearing is subjected both to a stationary (non-rotating) hydrostatic force and also to a rotating hydrodynamic force, with the hydrostatic force being of the same order of magnitude as the hydrodynamic force, and being due to the oil leaking through the slot in the segment.

The stationary hydrostatic force imparts behavior on the compressed film of oil that is not axially symmetrical and that is uncontrolled since the segments are free to rotate in the grooves of the outer ring of the bearing, which means they can be rotated in random manner by friction, thereby causing the angular positions of the slots in the segments to vary in uncontrolled manner relative to one another and relative to the outer ring of the bearing.

As a result, the behavior of the oil film is not controlled and the radial vibrations and eccentricity of the shafts cannot be damped in completely effective manner.

OBJECTS AND SUMMARY OF THE INVENTION

A particular object of the invention is to provide a solution to this problem that is simple, effective, and inexpensive, and that was previously unknown in the art, by eliminating or at least greatly reducing the hydrostatic force due to oil leaks localized in the above-mentioned segment slots.

To this end, the invention provides a device for supporting and guiding a shaft in rotation, in particular a rotor shaft of a turbomachine such as an airplane turboprop or turbojet, the device comprising at least one bearing mounted around the shaft and an oil squeeze damper arranged around the bearing, said damper comprising a housing formed in an outer case and defining an annular space around an outer ring of the bearing, which annular space is filled with oil and is closed axially by annular sealing elements that are free to rotate in annular grooves in said outer bearing ring and that co-operate in sealed manner with an inner cylindrical surface of the case, at least one oil feed orifice being formed in the case, and oil outlet orifices being formed in the annular sealing elements to allow oil to flow in said annular space and to allow said oil to be cooled outside the annular space, wherein each annular sealing element includes a plurality of calibrated oil outlet orifices spaced apart from one another in the outer periphery of said annular element and arranged in such a manner as to substantially cancel the resultant of the static forces generated in the oil film on rotation of the shaft and resulting from the oil leakage flows through said calibrated orifices.

Each of the oil leakage flows located at various points around the periphery of the segment generates a hydrostatic force on the bearing ring, with each force being oriented approximately in the direction of the corresponding outlet orifice.

By distributing these outlet orifices around the periphery of the segment, the resultant of these hydrostatic forces can be substantially canceled, while conserving solely the hydrodynamic forces that provide the desired damping of the orbital movement of the bearing ring. This makes it possible to obtain axially symmetrical behavior for the squeeze film damper and provides better control over the dynamic behavior of the rotor shaft.

Advantageously, the number of outlet orifices formed in each annular sealing element is less than or equal to 8, and is preferably less than or equal to 5.

Each annular element is split at a point around its circumference and has an even or odd number of calibrated oil outlet orifices, these orifices and the splitting slot in the annular element being distributed so as to be substantially equidistant from one another around the circumference of the annular element.

In a preferred embodiment of the invention, the number of calibrated orifices is odd and one of the orifices is diametrically opposite the slot in the annular element.

Conveniently, the calibrated oil outlet orifices are formed by notches in the outer periphery of the annular elements.

For the shaft of an airplane turboprop or turbojet rotor, the annular sealing elements are metal segments, in particular of rectangular section, and each may include a cross-cut slot or an oblique slot or an overlapping slot.

In other applications, where the rotary shaft is not subjected to high temperatures, the annular sealing elements can be constituted by O-rings including a small number of calibrated oil outlet orifices distributed around their circumference.

The invention also provides a turbomachine rotor shaft supported and guided by a device of the type described above.

Finally, the invention provides a turbomachine such as an airplane turboprop or turbojet, the turbomachine including a device of the above-described type for supporting and guiding a rotating shaft.

BRIEF DESCRIPTION OF THE DRAWINGS

The invention will be better understood and other characteristics, details, and advantages thereof will appear more clearly on reading the following description given by way of example and made with reference to the accompanying drawings, in which:

FIGS. 4, 5, and 6 are diagrammatic views showing the hydrostatic and hydrodynamic forces applied to the outer ring of a bearing in the prior art;

FIG. 7 is a diagrammatic perspective view of an annular sealing segment of the invention; and FIG. 8 is a diagrammatic view showing the hydrostatic forces applied to the outer ring of a bearing in accordance with the invention.

MORE DETAILED DESCRIPTION

Figure 1:
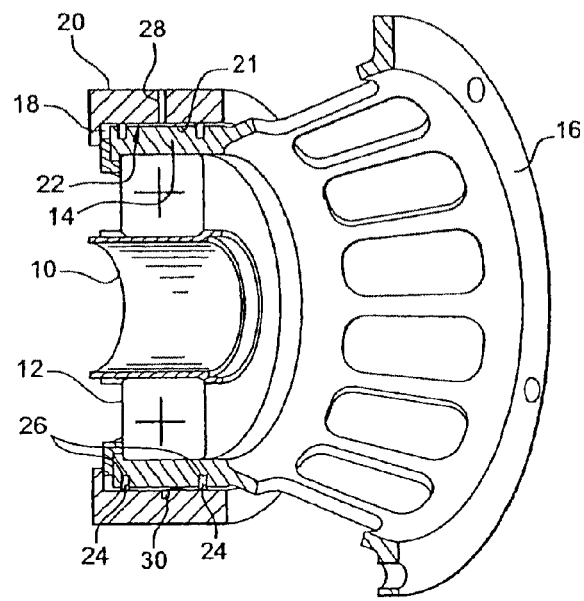
FIG. 1 is a diagrammatic perspective and axial section view of a portion of a rotor shaft fitted with a device of the invention.

In FIG. 1, reference 10 designates a rotor shaft of a turbomachine such as an airplane turboprop or turbojet, which shaft is centered and guided in rotation in a bearing 12, e.g. a rolling bearing having an outer ring 14 secured to a squirrel cage 16 and mounted in a cylindrical housing 18 of a case 20 so as to constitute a squeeze film damper around the ring 14.

An annular space 22 is defined around the ring 14 by the cylindrical surface 21 of the housing 18 and is closed axially by annular sealing elements 24 mounted in annular grooves 26 of the cylindrical outer surface of the ring 14. The annular space 22 is filled with oil fed via an inlet orifice 28 formed by a radial hole through the case 20 and opening out into an annular groove 30 in the cylindrical surface 21 around the ring 14.

In a variant, the oil can be fed to the annular space 22 via a plurality of radial holes 28 in the case 20, which holes are distributed around the axis rotation of the shaft 10.

For the rotor shaft of a turboprop or a turbojet, the annular sealing elements 24 are split metal segments of rectangular cross-section, these segments being mounted free to rotate in the annular grooves 26 of the ring 14 and pressing in sealing manner via their outer peripheries against the cylindrical surface 21 of the case 20.

Figure 2:
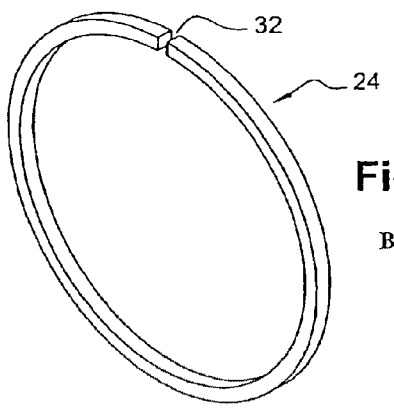
FIG. 2 is a perspective view of a prior art annular sealing segment.

In the prior art, the segments 24 are of the type shown in FIG. 2, e.g. having a cross-cut slot 32 constituting an oil outlet orifice whereby the oil fed into the annular space 22 via the radial hole(s) 28 in the case can flow inside the annular space and leave to the outside of this space via the slots 32 in the segments 24 in order to be cooled. In general, the oil fed into the annular space 22 also serves to lubricate the bearing 12.

Figure 3:
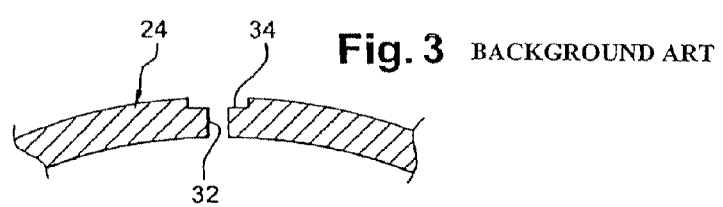
FIG. 3 is a fragmentary diagrammatic view of another prior art sealing segment.

In a variant, and as shown diagrammatically in FIG. 3, prior art segments 24 include steps 34 formed in their outer periphery in the vicinity of the slots 32 and serving to calibrate the flow rate of oil leakage through a slot 32.

The oil in the annular space 22 surrounding the ring 14 is at sufficient pressure to avoid cavitation phenomena during the orbital movements of the ring 14 in the housing 18. These orbital movements are due to the radial vibration and eccentricity of the shaft 10, and they are damped by compressing a film of oil between the ring 14 and the cylindrical surface of the housing 18.

Typically, the pressure of the oil in the annular space 22 is less than or equal to about 10 bars, and it can increase up to 100 bars in the oil film as compressed by the ring 14, with the thickness of this oil film being of the order of 0.2 millimeters (mm) to 0.3 mm.

When the ring 14 is fitted with segments 24 of the type shown in FIG. 2 or in FIG. 3, the flow rates of oil leakage localized in the slot 32 or the step 34 of each segment disturb the pressure field in the oil film and give rise to a hydrostatic force $F_S$ that is applied to the ring 14 and that is stationary (non-rotating), being oriented substantially towards the oil outlet orifice 32 or 34 as shown diagrammatically in FIGS. 4, 5, and 6.

The compression of the oil film in the annular space 22 by the ring 14 whose orbital movement is symbolized by arrow 36 also generates a hydrodynamic force $F_D$ which rotates and is of a direction that depends on the annular position of the ring 14 relative to the oil outlet orifice 32 or 34.

The amplitude of the hydrostatic force $F_S$ is substantially of the same order as that of the hydrodynamic force $F_D$. The oil leakage flow rates via the outlet orifices 32, 34 formed in the segments 24 also vary as a function of the angular position of the ring 14 in its orbital movement, the periphery of the ring 14 being capable of masking or more or less completely closing the outlet orifice 32 or 34 of each segment 24.

In addition, the segments 24 are free to rotate in the grooves 26 of the ring 14 and can therefore turn in said grooves, such that the angular positions of the outlet orifices 32 or 34 are never stationary and vary over time relative to one another and relative to the ring 14.

As a result, the behavior of the oil film under pressure is not axially symmetrical, which means that it is not possible to control the damping of the radial vibration and the dynamic eccentricity of the shaft 10.

The present invention enables this problem to be solved by forming a plurality of oil outlet orifices that are distributed around the circumference of a segment 24 as shown diagrammatically in FIG. 7, thus enabling a plurality of hydrostatic forces $F_S$ to be generated giving a resultant that is zero or substantially zero as shown diagrammatically in FIG. 8.

By way of example, the annular segment 38 of the invention includes a single slot 40 of the overlapping type allowing oil to flow out from an annular space 22 at a relatively small rate, and notches 42 formed in its outer periphery so as to authorize oil leaks out from the annular space 22 at calibrated rates, the notches 42 being disposed symmetrically relative to the slot 40 and in relatively uniform manner around the circumference of the segment 38.

The number of notches 42 is relatively small and is preferably less than or equal to 5. In the example shown, the segment 38 has five notches 42, one of which is diagrammatically opposite the slot 40 in the segment.

The flows of oil leaking through the slot 40 and the notches 42 are thus distributed around the circumference of the segment 38, with the small number of notches 42 making it possible to calibrate accurately the total oil leakage flow rate, which would not be possible if the number of notches formed in the periphery of the segment 38 were relatively large.

FIG. 8 shows the resultant provided by the invention when the segment 38 has three identical or substantially identical oil outlet orifices 42 formed at 120° from one another in its outer periphery.

In this configuration, each leakage flow localized at one of the orifices 42 generates a hydrostatic force $F_S$ applied to the ring 14, with the three forces $F_S$ being oriented at 120° relative to one another and producing a resultant that is zero or substantially zero. The ring 14 is therefore subjected only to the rotating hydrodynamic force which leads to axially symmetrical behavior of the compressed oil film, thereby ensuring that the radial vibration and dynamic eccentricity of the rotor shaft is damped in the desired manner.

A segment of the invention may have an overlapping cut as shown in FIG. 7, or a cross-cut as shown in FIG. 2, or an oblique cut.

When the shaft 10 is not a turbojet or turboprop rotor shaft with bearings that are likely to be subjected to high temperatures, the annular sealing elements of the ring 14 may be constituted by O-rings having calibrated oil outlet orifices formed in their outer peripheries.

What is claimed is:

1. A device for supporting and guiding a shaft in rotation in a turbomachine, the device comprising:
    at least one bearing mounted around the shaft and an oil squeeze damper disposed around the bearing,
    said damper comprising a housing disposed in an outer case and defining an annular space around an outer ring of the bearing,
    wherein said annular space is configured to be filled with oil to form an oil film and is closed axially by annular sealing elements,
    wherein said annular sealing elements are configured to rotate freely in annular grooves in said outer bearing ring and each annular sealing element comprises an outer peripheral surface co-operating in sealed manner with an inner cylindrical surface of the case;
    the device further comprising at least one oil feed orifice disposed in the case; and
    oil outlet orifices disposed in the annular sealing elements configured to allow oil to flow in said annular space and configured to allow said oil to be cooled outside the annular space,
    wherein each annular sealing element includes calibrated oil outlet orifices disposed on the outer peripheral surface of said annular sealing element and arranged in such a manner as to substantially cancel a resultant of static forces generated in the oil film on rotation of the shaft and resulting from the oil leakage flows through said calibrated orifices,
    wherein the number of orifices disposed on each annular sealing element is less than 8, and
    wherein each annular sealing element is split by a splitting slot at a point around its circumference and has an even or odd number of calibrated oil outlet orifices,
    said orifices and the splitting slot in the annular sealing element being distributed so as to be substantially equidistant from one another around the circumference of the annular element.

2. A device according to claim 1, wherein the number of calibrated orifices formed in each annular sealing element is less than or equal to 5.

3. A device according to claim 1, wherein the above-mentioned number of orifices is odd, with one of said orifices being diametrically opposite the splitting slot in the annular sealing element.

4. A device according to claim 1, wherein said calibrated oil outlet orifices includes notches in the outer peripheral surface of the annular sealing elements.

5. A device according to claim 1, wherein the annular sealing elements are metal segments of rectangular section.

6. A device according to claim 5, wherein each segment includes a slot that is cross-cut or that is obliquely cut or that is cut with an overlap.

7. A device according to claim 1, wherein the annular sealing elements are O-rings.

8. A turbomachine rotor shaft supported and guided by a device according to claim 1.

9. A turbomachine such as an airplane turboprop or turbojet, the turbomachine including a device according to claim 1 for supporting and guiding a rotating shaft.

10. The device according to claim 1, wherein the pressure of the oil in the annular space is less than or equal to 100 bars.

11. The device according to claim 1, wherein the thickness of the oil film is about 0.2 millimeters to 0.3 millimeters.

12. The device according to claim 1, wherein the splitting slot includes first and second sides configured to overlap each other.

13. The device according to claim 1, wherein the oil outlet orifices extend completely across the outer peripheral surface in a direction parallel to an axis of rotation of the shaft.

* * * * *